(12) United States Patent
Watte et al.

(10) Patent No.: US 7,116,882 B2
(45) Date of Patent: Oct. 3, 2006

(54) DEVICE FOR CLEAVING AN OPTICAL FIBRE

(75) Inventors: Jan Watte, Grimbergen (BE); Luiz Neves Mendes, Begijnendijk (BE); Lodewijk Van Noten, Belgium (BE); Thomas T. De Boer, Nijmegen (NL); Alan Roland Torry, Warwick (GB); Michael Andrew Beard, Southam (GB)

(73) Assignee: Tyco Electronics Raychem NV, (BE)

( * ) Notice: Subject to any disclaimer, the term of this patent is extended or adjusted under 35 U.S.C. 154(b) by 0 days.

(21) Appl. No.: 10/521,211

(22) PCT Filed: Jul. 4, 2003

(86) PCT No.: PCT/GB03/02889

§ 371 (c)(1),
(2), (4) Date: Jan. 13, 2005

(87) PCT Pub. No.: WO2004/008205

PCT Pub. Date: Jan. 22, 2004

(65) Prior Publication Data

US 2005/0226586 A1    Oct. 13, 2005

(30) Foreign Application Priority Data

| Jul. 16, 2002 | (GB) | ................... | 0216434.1 |
| Jul. 16, 2002 | (GB) | ................... | 0216435.8 |
| Jul. 16, 2002 | (GB) | ................... | 0216436.6 |
| Feb. 18, 2003 | (GB) | ................... | 0303703.3 |
| Apr. 4, 2003 | (GB) | ................... | 0307762.5 |

(51) Int. Cl.
  *G02B 6/00* (2006.01)
(52) U.S. Cl. ................... 385/134; 83/913; 225/94
(58) Field of Classification Search ............. 385/72, 385/87, 134, 75; 83/913; 225/94
See application file for complete search history.

(56) References Cited

U.S. PATENT DOCUMENTS 4,229,876 A * 10/1980 Doty ........................ 29/469

(Continued)

FOREIGN PATENT DOCUMENTS

EP    62011806    1/1987

(Continued)

OTHER PUBLICATIONS

British Search Report issued for GB 0216434.1; date of search Oct. 16, 2002.

(Continued)

*Primary Examiner*—John D. Lee
*Assistant Examiner*—Rhonda S. Peace
(74) *Attorney, Agent, or Firm*—Myers Bigel Sibley & Sajovec

(57) ABSTRACT

A device for cleaving an optical fibre includes a fixing mechanism to fix a fixing element to the optical fibre, and a cleaving mechanism to cleave the optical fibre. The fixing element may be a ferrule, and the fixing element may be fixed to the fibre such that the fibre extends through the fixing element. The cleaving mechanism cleaves the fibre preferably when the fixing element has been fixed to the fibre. The cleaving device may be a hand-held, and hand-operated, tool. The device may enable the possibility of automatic preset positioning and/or orienting of the cleaved fibre end face (which may be angled to the axis of the fibre) with respect to the fixing element. Attachments may be provided for holding the fibre and fixing element during the cleaving operation and for holding a connector body while the fixing element with the cleaved fibre is inserted into the connector.

38 Claims, 15 Drawing Sheets

U.S. PATENT DOCUMENTS

| | | | | |
|---|---|---|---|---|
| 4,621,754 | A | * | 11/1986 | Long et al. ................... 225/96 |
| 4,738,508 | A | | 4/1988 | Palmquist |
| 4,893,892 | A | | 1/1990 | Ziemek et al. |
| 4,953,941 | A | | 9/1990 | Takahashi |
| 4,976,390 | A | * | 12/1990 | Gee et al. ................... 225/96 |
| 5,265,183 | A | | 11/1993 | Feng et al. |
| 5,363,459 | A | | 11/1994 | Hultermans |
| 5,395,025 | A | * | 3/1995 | Borer et al. ................... 225/2 |
| 5,446,819 | A | | 8/1995 | Foster et al. |
| 5,682,451 | A | | 10/1997 | Lee et al. |
| 5,727,101 | A | | 3/1998 | Giebel |
| 5,734,770 | A | * | 3/1998 | Carpenter et al. ............ 385/72 |
| 6,581,889 | B1 | * | 6/2003 | Carpenter et al. .......... 248/160 |
| 6,628,879 | B1 | * | 9/2003 | Robinson et al. ........... 385/134 |
| 2002/0067893 | A1 | * | 6/2002 | Uken ........................... 385/75 |
| 2003/0015076 | A1 | * | 1/2003 | Tanaka et al. ................. 83/72 |

FOREIGN PATENT DOCUMENTS

| | | | |
|---|---|---|---|
| EP | 0415839 | | 3/1991 |
| EP | 0463404 | | 1/1992 |
| EP | 0599780 | | 6/1994 |
| EP | 0366346 | | 12/1994 |
| EP | 637763 | A1 * | 2/1995 |
| EP | 0381513 | | 9/1995 |
| EP | 0856751 | | 5/1998 |
| EP | 0780710 | | 10/2001 |
| GB | 2102144 | | 1/1983 |
| JP | 59024818 | | 2/1984 |
| JP | 63280205 | | 11/1988 |
| JP | 1216304 | | 8/1989 |
| JP | 2226205 | | 9/1990 |
| JP | 7020355 | | 1/1995 |
| JP | 9203815 | | 8/1997 |
| JP | 10206696 | | 8/1998 |
| JP | 10319274 | | 12/1998 |
| JP | 2000241666 | | 9/2000 |
| JP | 2001356241 | | 12/2001 |
| WO | WO 91/02994 | | 3/1991 |
| WO | WO 91/03750 | | 3/1991 |
| WO | WO 00 41013 | | 7/2000 |

OTHER PUBLICATIONS

British Search Report issued for GB 0216435.8; date of search Oct. 16, 2002.

British Search Report issued for GB 0216436.6; date of search Oct. 16, 2002.

British Search Report issued for GB 0303703.3; date of search Jul. 3, 2003.

International Preliminary Examination Report issued for PCT/GB 03/02889; completed on Aug. 26, 2004.

International Search Report issued for PCT/GB03/02889, mailed on Sep. 12, 2003.

Written Opinion issued for PCT/ GB 03/02889, mailed on Aug. 4, 2004.

* cited by examiner

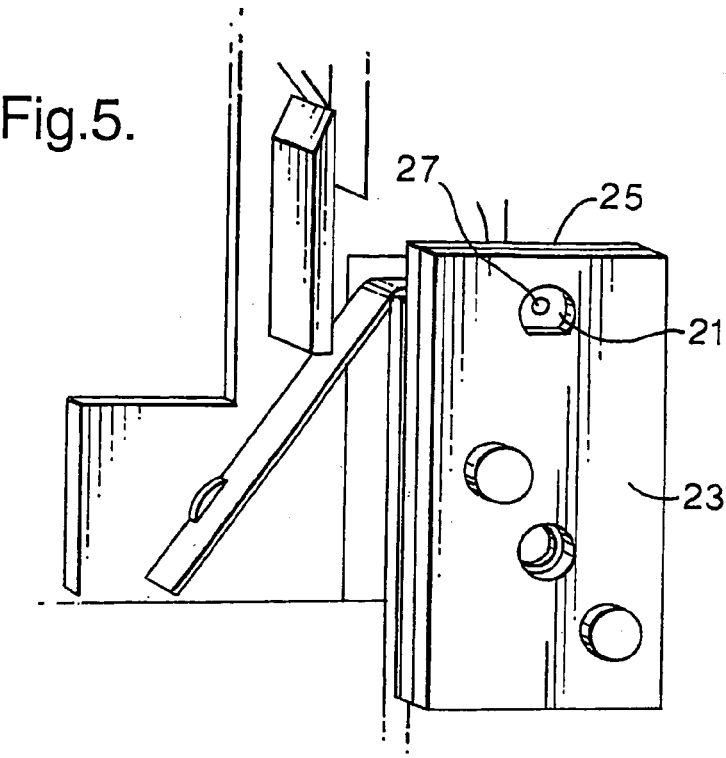
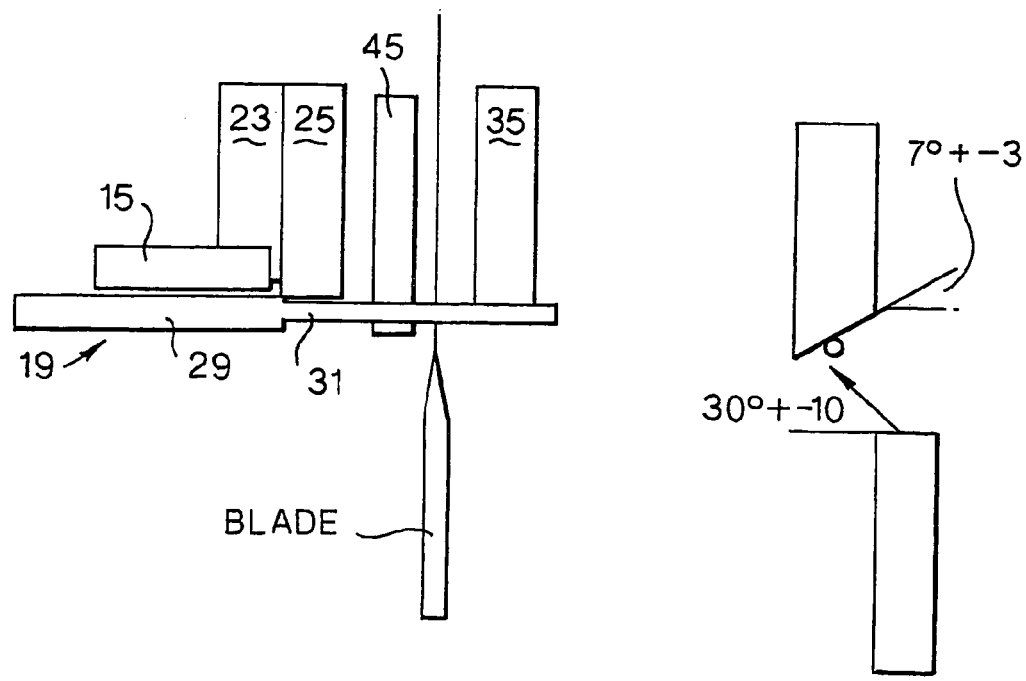

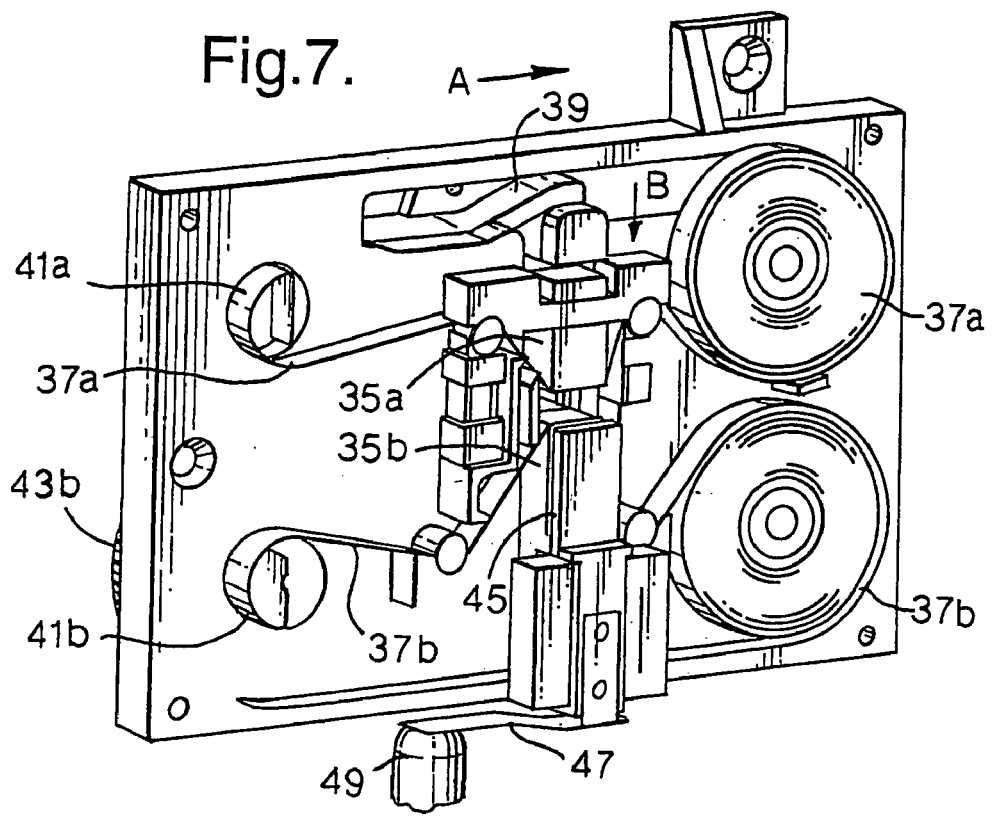
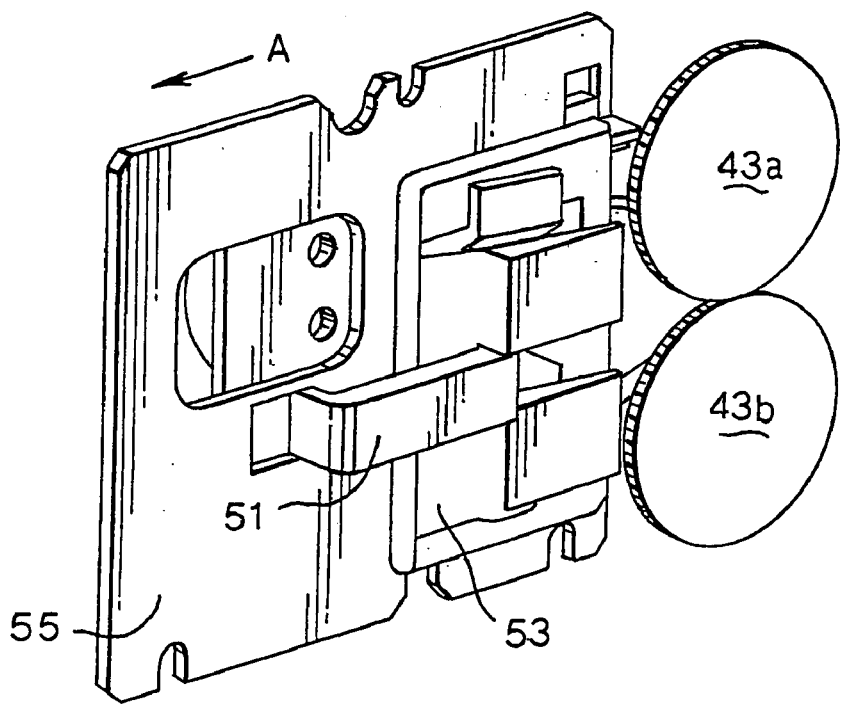

Fig. 14.
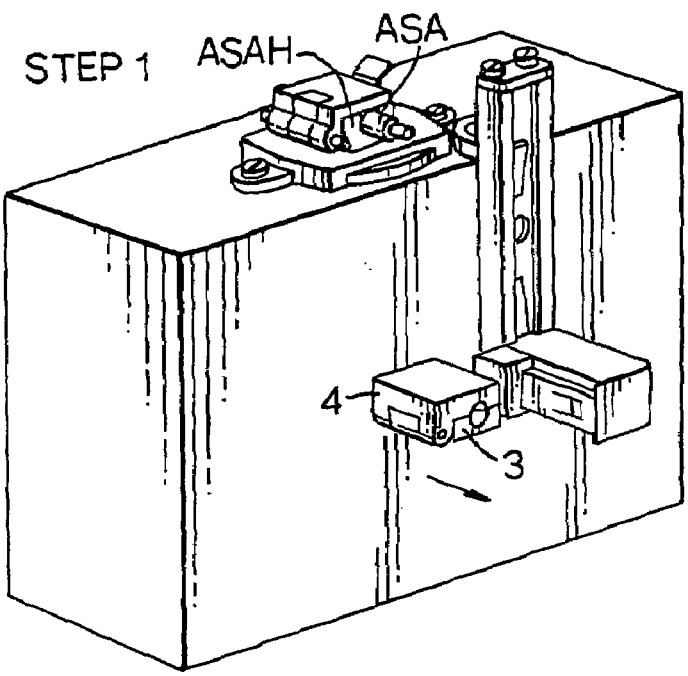
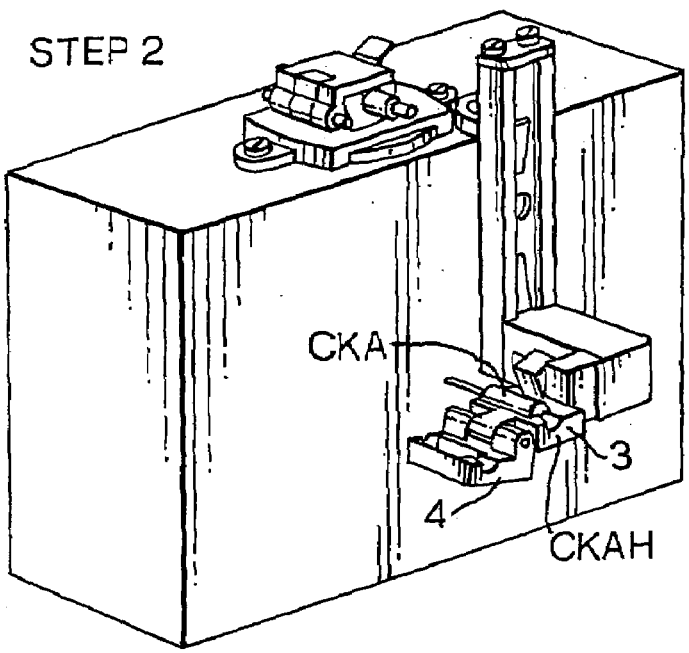

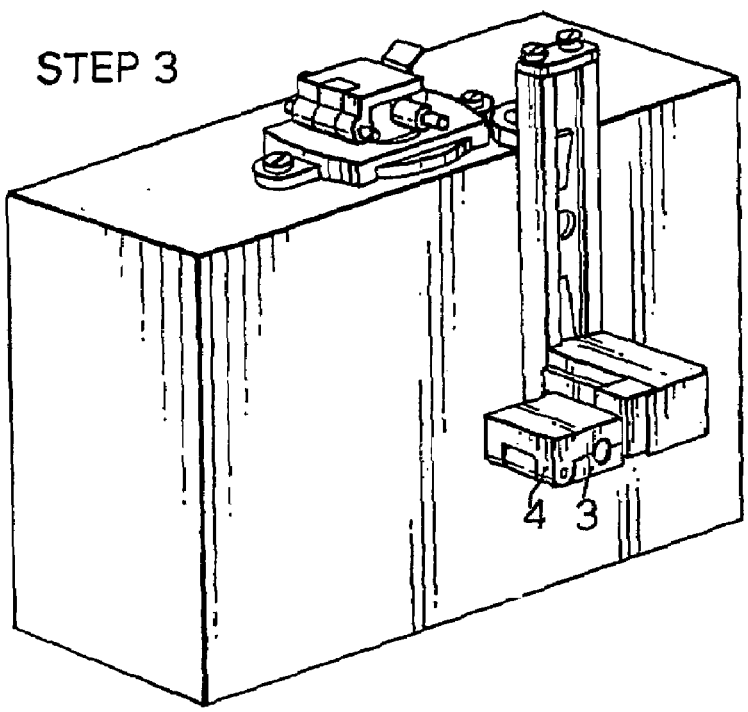
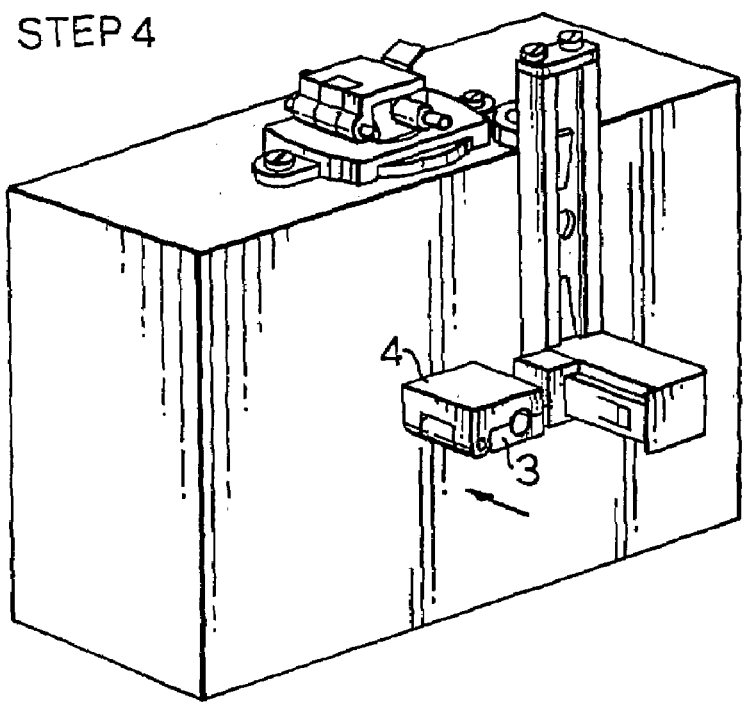
Fig. 15.

Fig.16.
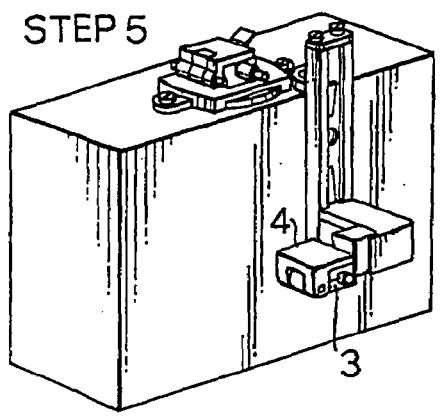
STEP 5
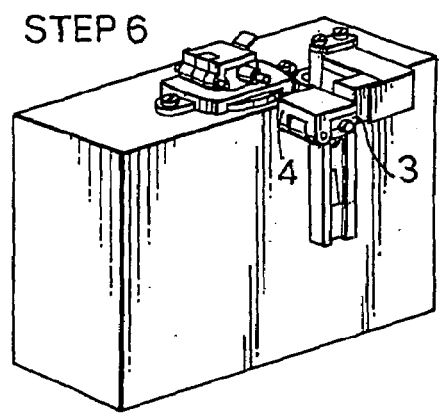
STEP 6
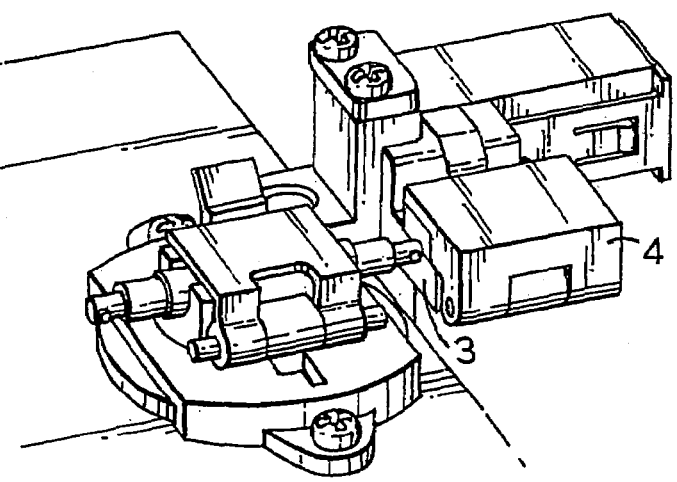
STEP 7

Fig.17.
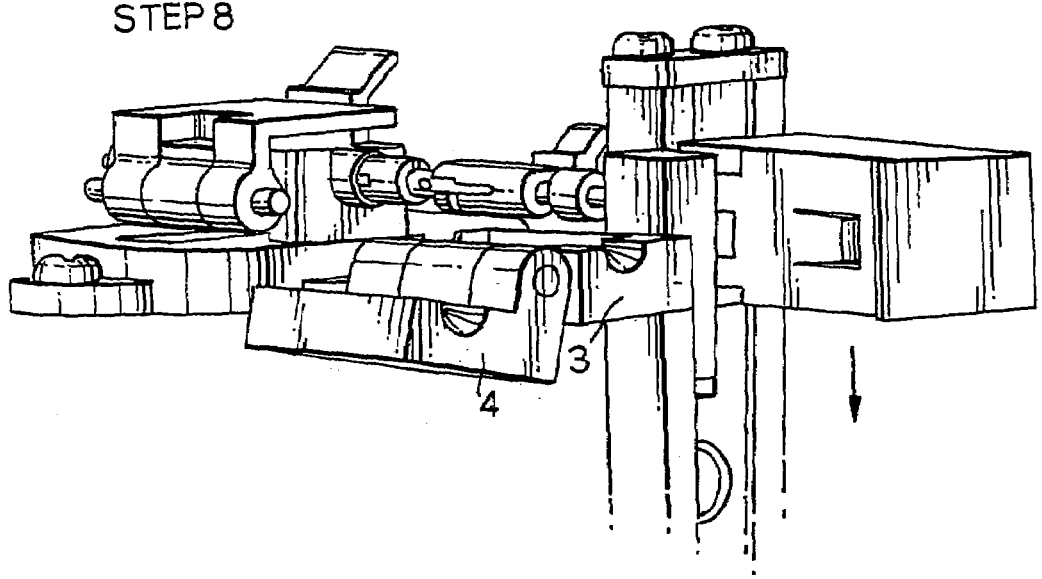
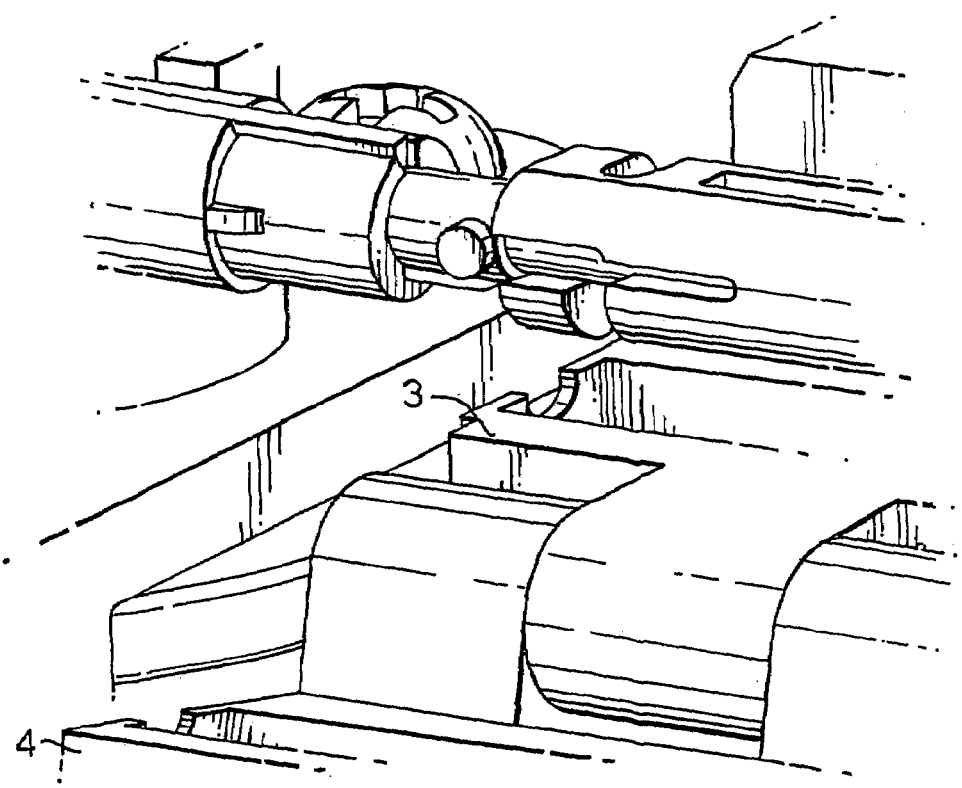

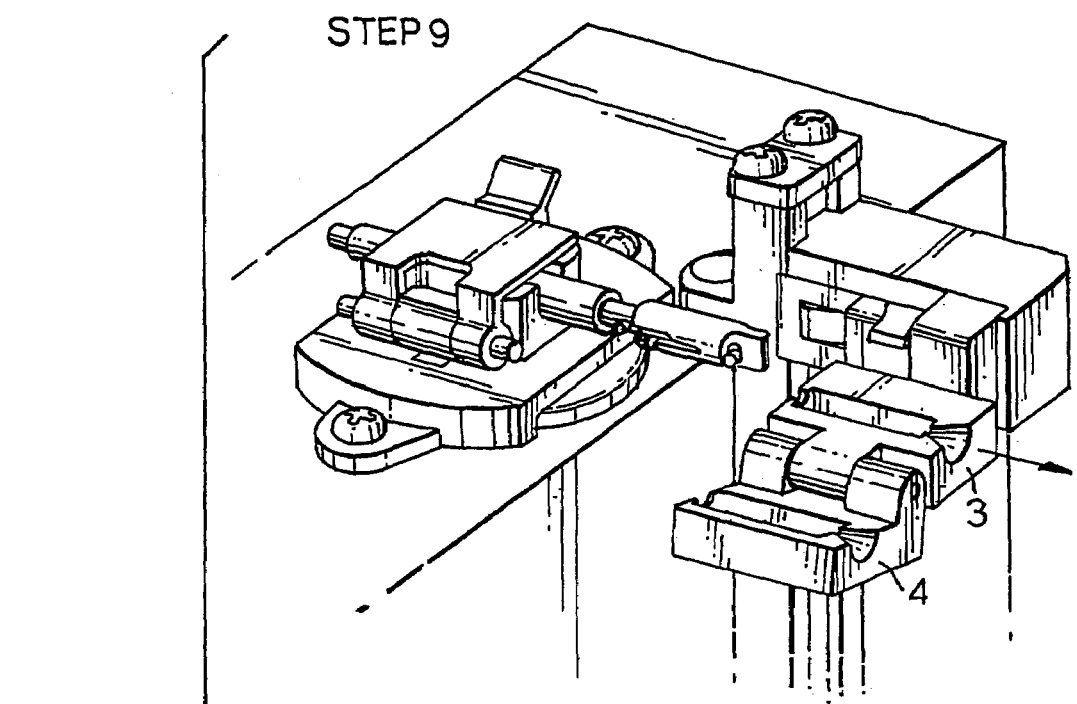
STEP 9
Fig.18.
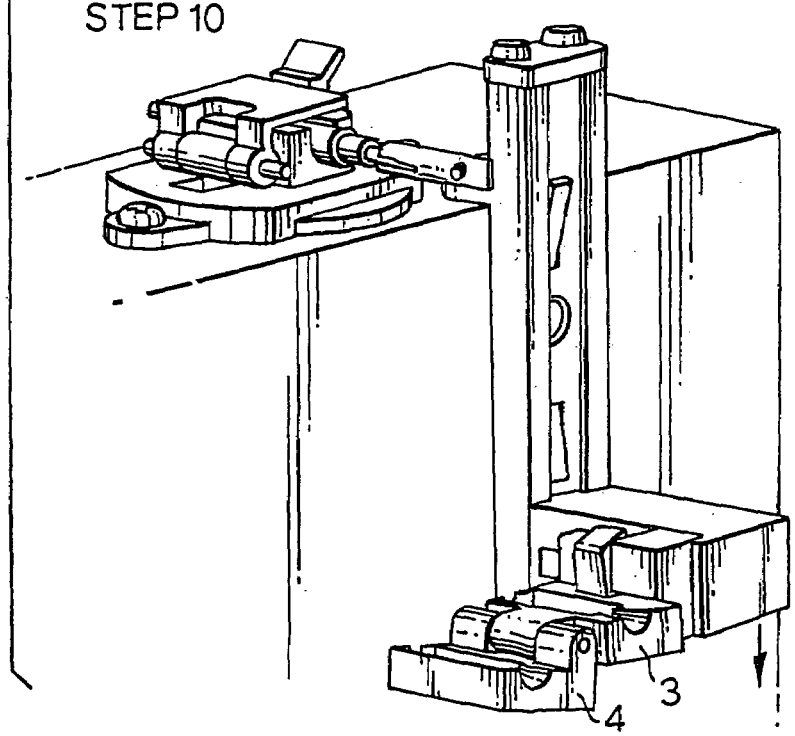
STEP 10

Fig.19.
STEP 11
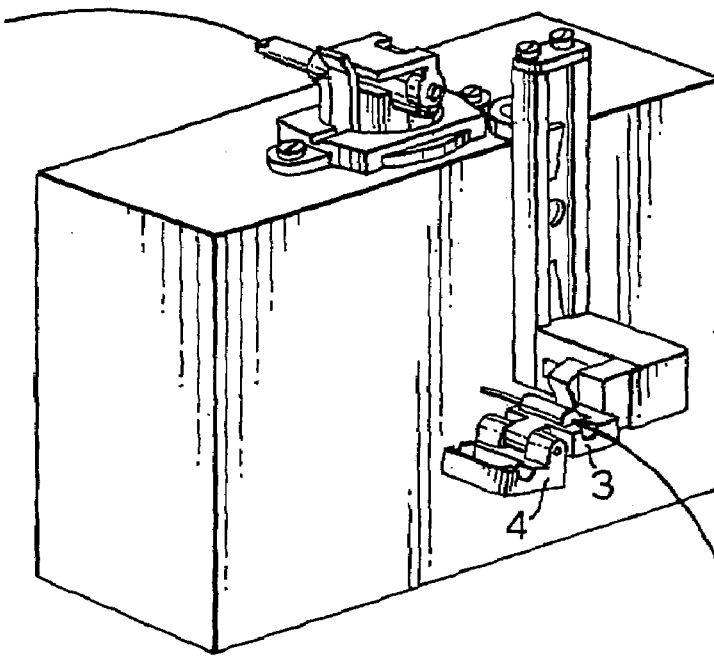
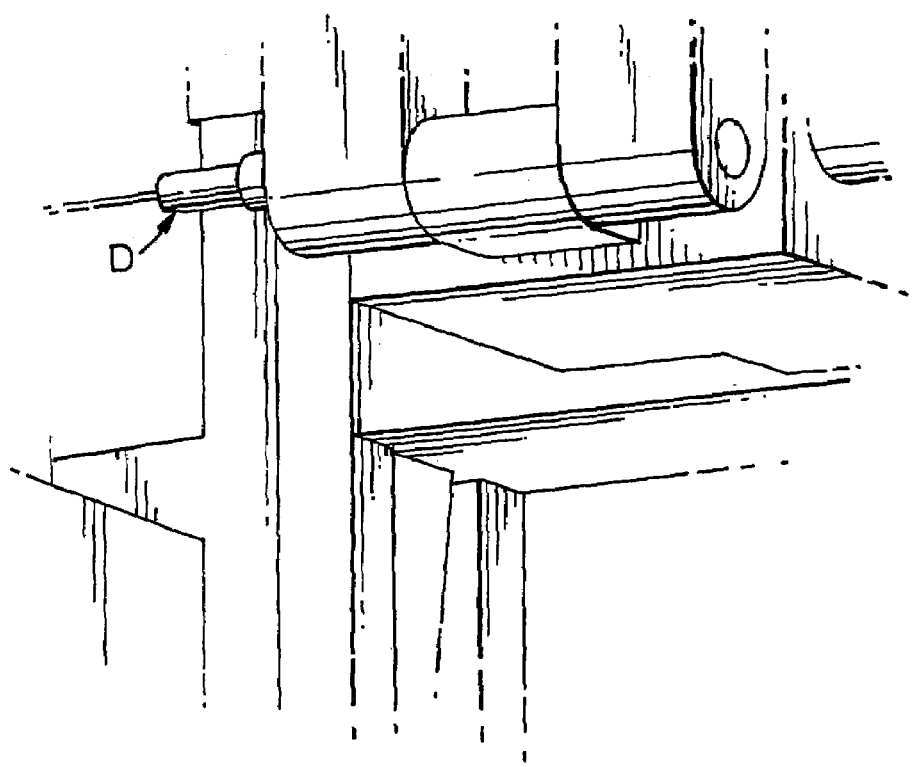

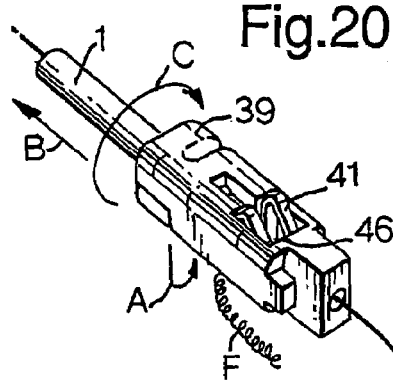
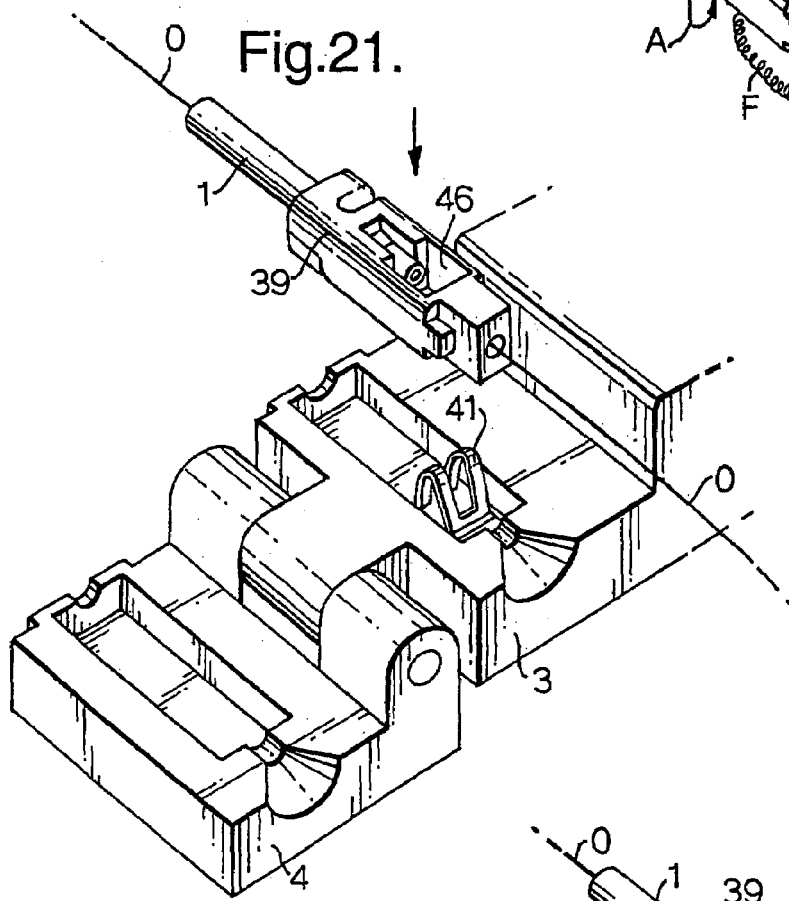
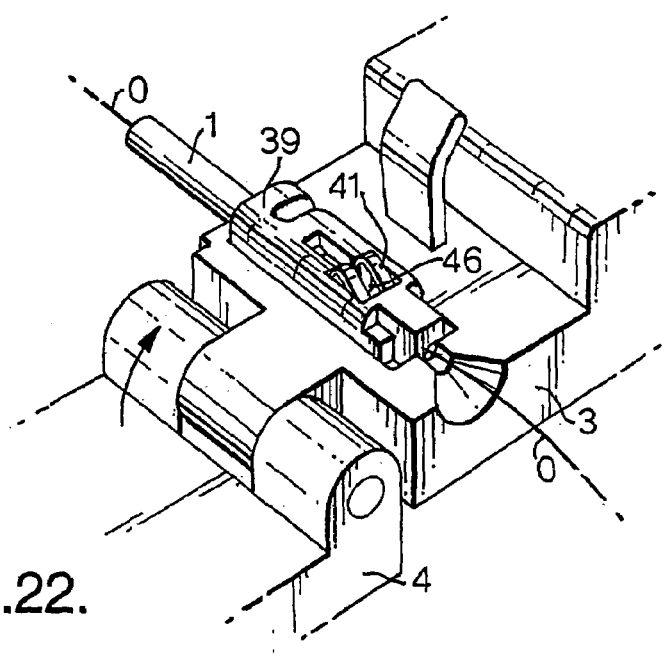

DEVICE FOR CLEAVING AN OPTICAL FIBRE

CLAIMS FOR PRIORITY AND RELATED APPLICATIONS

The present application is a National Phase application of PCT/GB2003/002889 filed on Jul. 4, 2003 and published in English (International Publication No. WO 2004/008205), which claims priority from GB Application No(s). GB 0216434.1 filed on Jul. 16, 2002; GB 0216436.6 filed on Jul. 16, 2002; GB 0216435.8 filed on Jul. 16, 2002; GB 0303703.3 filed on Feb. 18, 2003 and GB 0307762.5 filed on Apr. 4, 2003, the disclosures of which are incorporated herein by reference in their entireties.

FIELD OF INVENTION

The present invention relates to a device for cleaving an optical fibre, and in particular such a device in the form of a hand-held tool.

BACKGROUND OF THE INVENTION

When splicing optical fibres mechanically, for example by means of a permanent optical fibre connector, it is generally necessary to prepare the end faces of the fibres to ensure that a satisfactory splice, having low optical losses, is formed.

Co-pending United Kingdom Patent Application No. 0216435.8 (B429) filed by the present applicant discloses an optical fibre connector in which a splice between two optical fibres is formed by means of two ferrules inserted into a connector body, each of which is pre-fixed to a respective optical fibre in a preset orientation with respect to an angled end face of the optical fibre. (By "angled end face" is meant an end face of the optical fibre that is not perpendicular to the longitudinal axis of the fibre.) The ferrules can be inserted into the connector body only in a preset orientation about their axes, and therefore the relative orientations of the two fibre end faces are predetermined to ensure an intimate and low-loss contact between the end faces.

International Patent Application WO 98/54608 discloses a tool for the angled cleaving of optical fibres. The tool cleaves an optical fibre by clamping the fibre under tension by means of two clamping blocks, displacing the fibre between the clamping blocks by means of an anvil so that the displaced part of the fibre experiences a localised shear force, and scoring the fibre. Because the scored part of the fibre is under both tension and shear, the fibre cleaves at an angle away from the perpendicular to the fibre axis. The cleaving tool may be used to cleave an optical fibre that has a ferrule attached to it prior to the insertion of the fibre into the tool. In addition, for polarisation-maintaining (PM) optical fibres, a ferrule that has been pre-attached to such a fibre may be placed in the cleaving tool in a fixed orientation so that the angle of cleave is in the correct orientation with respect to the polarisation axis of the PM optical fibre.

SUMMARY OF THE INVENTION

According to a first aspect, the present invention provides a device for cleaving an optical fibre, comprising a fixing mechanism to fix a fixing element to the optical fibre, and a cleaving mechanism to cleave the optical fibre.

A second aspect of the invention provides a device according to the first aspect of the invention, comprising a hand-held tool.

At least in the broadest aspects of the invention, the fixing element may be any element (or component) that is fixed to the optical fibre by the fixing mechanism. The fixing element may, for example, be an optical fibre connector or a part thereof, but in the broadest aspects of the invention the fixing element is not so limited.

It is presently preferred for the fixing element to be in the form of a ferrule. The ferrule (or other fixing element) may, for example, be used to secure an optical fibre to an optical fibre connector. However, the broadest aspects of the term "ferrule" are not intended to be limited to such use.

The fixing element may generally be fixed to the optical fibre in any convenient way by the fixing mechanism. Preferably the fixing element is fixed to the optical fibre such that the fibre extends through the fixing element. In the broadest aspects of the invention, however, the fibre need not extend through the fixing element when fixed thereto.

In the description that follows, for the sake of convenience the fixing element is generally referred to as a ferrule. It is to be understood, however, that (at least in the broadest aspects of the invention) the fixing element need not comprise a ferrule.

The invention has the advantage that because the device both fixes a fixing element (e.g. a ferrule) to an optical fibre and cleaves the fibre, two steps in the process of splicing optical fibres (for example) may be carried out by a single device, thus simplifying and increasing the speed of the splicing process.

At least in the broadest aspects of the invention, the cleaving mechanism of the device may cleave the optical fibre prior to, or substantially simultaneously with, the fixing of the fixing element to the fibre by the fixing mechanism. Preferably however, the cleaving mechanism of the device cleaves the fibre when the fixing element has been fixed thereto. More preferably, the cleaving mechanism of the device is able to cleave the fibre only when the fixing element has been fixed thereto.

Because the device preferably cleaves the fibre once the ferrule (or other fixing element) has been fixed to the fibre, this enables the possibility of the cleaved end face of the fibre being produced at a preset position along the fibre with respect to the ferrule and/or at a preset orientation with respect to the ferrule. This can be extremely beneficial, because it can enable the quick and accurate formation of a low-loss (high return loss) optical fibre splice, by bringing the angled cleaved end faces of the optical fibres physically into contact in a keyed orientation. In particular, because the device according to the invention enables the possibility of such preset positioning and/or orienting of the cleaved fibre end face with respect to the ferrule, it substantially removes the need for skill and judgement on the part of the technician carrying out the splicing operation to perform this operation. Consequently, the invention can improve the quality and consistency of optical fibre splices. Optical fibres that have been prepared by means of the device according to the invention may, for example, simply be inserted into a connector body arranged such that mere insertion of the ferrules fixed to the fibres by the device ensures the correct relative positioning of the end faces of the fibres to achieve a low-loss splice. Such a connector may, for example, be as disclosed in UK Patent Application No. 0216435.8.

The fixing mechanism of the device preferably is a crimping mechanism to crimp the ferrule (or other fixing element) and thereby fix it to the fibre.

As mentioned above, the fixing mechanism and the cleaving mechanism of the device according to the invention preferably are arranged such that the fibre is cleaved, and consequently an end face of the fibre is produced, at a preset position along the fibre with respect to the ferrule.

Advantageously, the cleaving mechanism may cleave the optical fibre such that the end face produced is oriented at a non-perpendicular angle with respect to a longitudinal axis of the fibre.

Preferably the fixing mechanism and the cleaving mechanism of the device are mutually arranged such that the fibre end face produced by the cleaving mechanism is at a preset orientation with respect to the ferrule. Consequently, the fixing mechanism preferably includes orientation determining means arranged to orient the ferrule at a predetermined orientation about the longitudinal axis of the fibre, with respect to the cleaving mechanism. The orientation determining means may, for example, comprise a non-circular orifice arranged to receive therein a ferrule having a corresponding non-circular cross-section. The device preferably includes (first) closing means that closes the non-circular orifice when the device is not in operation.

Advantageously, the device may include an aperture (preferably on an opposite side of the device to the non-circular orifice) by which a separated end portion of the cleaved optical fibre may be removed from the device. The device preferably includes (second) closing means that closes the aperture when the device is not in operation.

Such closing means substantially prevent dust and other contaminants entering the device, which could otherwise adversely affect its performance. In this way, the device may be substantially maintenance-free.

The fixing mechanism of the device preferably grips the ferrule while the cleaving mechanism cleaves the fibre. Advantageously, therefore, the fixing mechanism preferably grips the fibre (via the ferrule) while the cleaving mechanism cleaves the fibre. Additionally, the fixing of the fibre in a ferrule, by the fixing mechanism, may provide axial pull resistance and torsion resistance to the fibre.

The cleaving mechanism of the device preferably includes a clamping mechanism that grips the fibre while the fibre is cleaved. Preferably the clamping mechanism grips the fibre prior to, and during, the cleaving of the fibre. More preferably, the clamping mechanism may comprise a pair of tapes between which the fibre is gripped, the tapes preferably being arranged such that for each fibre that is cleaved by the device a different position along the tapes is used to grip the fibre.

Preferably the fibre is placed under tension and/or shear by the cleaving mechanism while the fibre is cleaved. The cleaving mechanism preferably includes an anvil that causes the fibre to be bent while the fibre is cleaved. The cleaving mechanism preferably includes a scoring blade arranged to score the fibre, causing a crack to propagate through the fibre, thereby cleaving the fibre. The scoring blade preferably is arranged such that for each fibre that is cleaved by the device, a different position on the blade is used to score the fibre.

The device preferably includes a lifetime indicator that indicates the number of cleaves that have been made by the device since a device set-up procedure and/or the number of cleaves remaining for the device, preferably until a device re-set procedure. The device set-up procedure and/or re-set procedure preferably comprises changing the blade and/or the tapes of the cleaving mechanism.

In at least some preferred embodiments of the invention, the device is arranged to cleave a plurality of optical fibres substantially simultaneously. Advantageously, therefore, the fixing mechanism may be arranged to fix one or more fixing elements to the plurality of optical fibres, preferably substantially simultaneously. The plurality of optical fibres may, for example, comprise ribbon fibre.

BRIEF DESCRIPTION OF THE DRAWINGS

An embodiment of the invention will be described, by way of example, with reference to the accompanying drawings, of which:

FIG. 5 shows another detail of the interior of the device;

FIG. 6 is a schematic diagram of the main components and the functioning of the cleaving mechanism of the device;

FIG. 7 is a detail of part of the interior of the device, illustrating the cleaving mechanism;

FIG. 8 is a detail illustrating the cleaving mechanism of FIG. 7 from a reverse angle;

FIGS. 14 to 19 illustrate successive steps in using the attached CKAH and ASAH.

FIGS. 20 to 23 illustrate the re-useable spring aspect of the invention.

DETAILED DESCRIPTION OF EMBODIMENTS OF THE INVENTION

Figure 1:
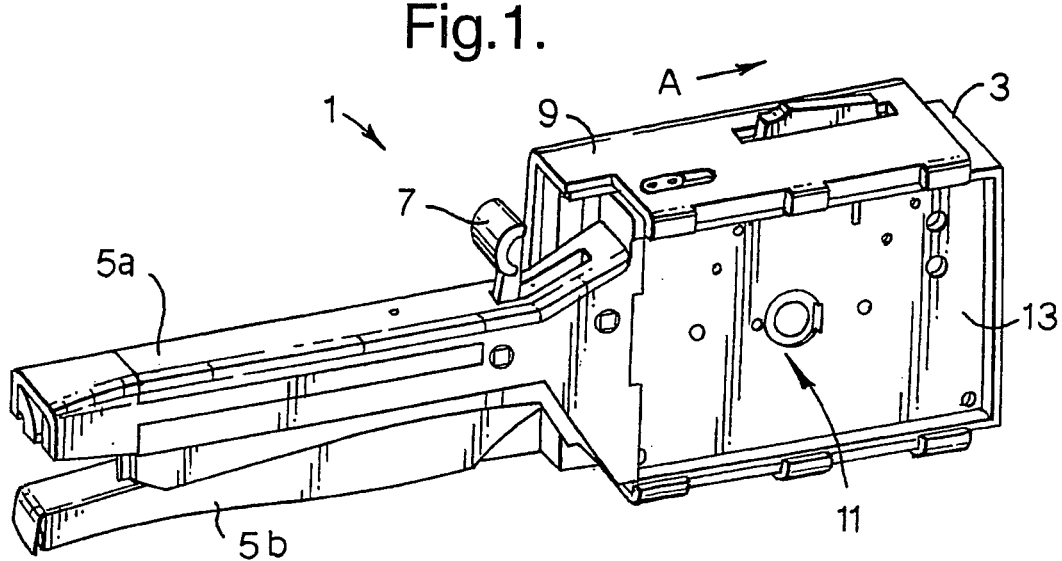
FIG. 1 shows an embodiment of an optical fibre cleaving device according to the invention, in the form of a hand-held tool.

FIG. 1 shows an exterior view of a preferred embodiment of an optical fibre cleaving device 1 according to the invention. The device 1 is in the form of a hand-held and manually operated tool. The tool comprises a main part 3 and a pair of handles 5a and 5b.

The handles 5a and 5b are sized and shaped to be gripped by the hand of a user. Squeezing the handles together operates the crimping mechanism whereby a ferrule is fixed to an optical fibre by crimping the ferrule around the fibre, as described below. The handles 5a and 5b have an over-centre camming action whereby they lock in place when squeezed together by a preset angle. The locked handles may be unlocked by means of a release lever 7.

The main part 3 of the device 1 comprises a slidable outer housing part 9 that operates the cleaving mechanism of the device whereby an optical fibre to which a ferrule has been fixed is cleaved to produce a controlled end face of the fibre. Subsequent to operating the crimping mechanism by squeezing the handles 5a and 5b together, the user moves the slidable part 9 with respect to the remainder of the device, in a direction away from the handles (as indicated by arrow A). This movement of the part 9 causes the cleaving mechanism of the device to clamp and cleave the optical fibre, as described below. Preferably the part 9 can be moved (thereby actuating the cleaving mechanism) only once the handles 5a and 5b have been squeezed together, so that the cleaving operation can take place only once the crimping operation has taken place.

Figure 2:
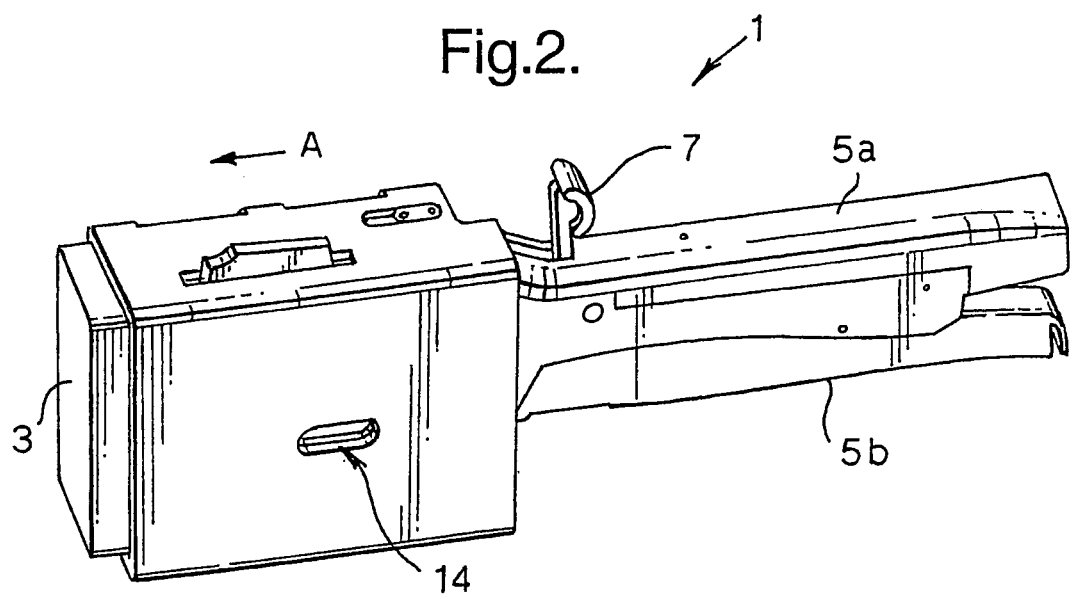
FIG. 2 shows the device of FIG. 1 from a reverse angle.

In order to carry out these operations, the user first inserts the ferrule at a predetermined orientation into the device and feeds a stripped optical fibre through the ferrule, into an insertion hole 11 in a front plate 13 of the device 1. An opposite side of the device, shown in FIG. 2, includes another aperture 14 by which a separated end portion of the cleaved optical fibre may be removed from the device.

Figure 12:
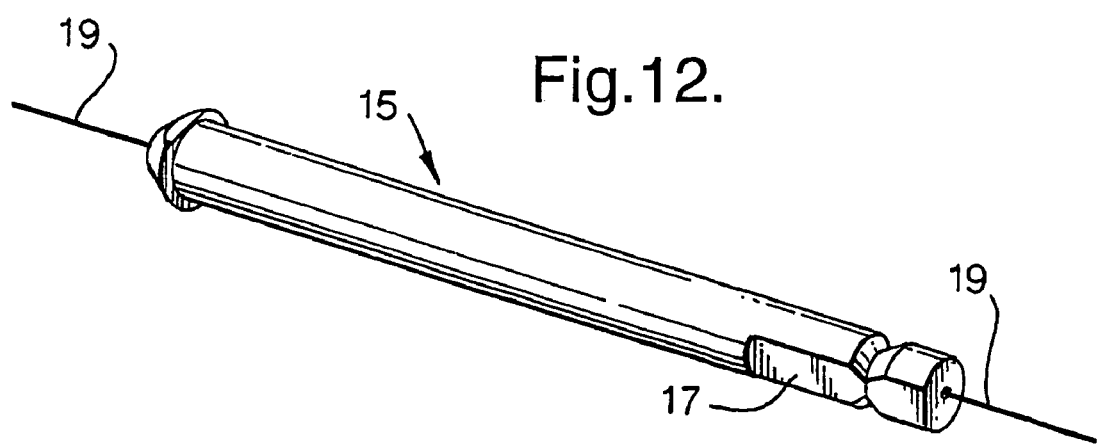
FIG. 12 shows an example of a suitable ferrule to be crimped to an optical fibre by means of the device.

The ferrule that is inserted into the device may comprise part of a holder/ferrule assembly as disclosed in UK Patent Application No. 0216435.8, the entire disclosure of which is incorporated herein by reference. An example of a suitable ferrule 15 for use with the device according to the invention is illustrated in FIG. 12. The ferrule 15, which is generally circular in cross-section, includes a flat portion 17 on its peripheral surface so that the orientation of the ferrule about its axis (and the axis of the optical fibre 19) may be preset. In particular, the cross-sectional shape of a front portion of the ferrule is arranged substantially to match that of a non-circular (and preferably generally "D"-shaped) aperture 21 in a plate 23 located behind the front plate 13 of the device (see FIG. 5).

The aperture 21 constitutes the orientation determining means of the device as referred to previously, by which the ferrule is oriented at a predetermined orientation with respect to the cleaving mechanism of the device. Plate 23 and aperture 21 are shown in FIG. 5, and are schematically shown in cross-section in FIG. 6. Behind plate 23 is a further plate 25 containing a smaller diameter aperture 27 that is substantially coaxial with the D-shaped aperture 21. Smaller aperture 27 is arranged to provide a stop for an end of the primary coating 29 of an optical fibre, which coating will have been stripped away from an end region 31 of the fibre 19, as shown schematically in FIG. 6. The ferrule 15 is inserted into the insertion hole 11 in the front plate 13 of the device and a stripped fibre 19 is fed through the ferrule. The front of the ferrule 15 butting against the back of the D-shaped orientation determining aperture 21 of plate 23, and the front of the stripped away primary coating of the fibre butting against the aperture 27 in the further plate 25.

Figure 3:
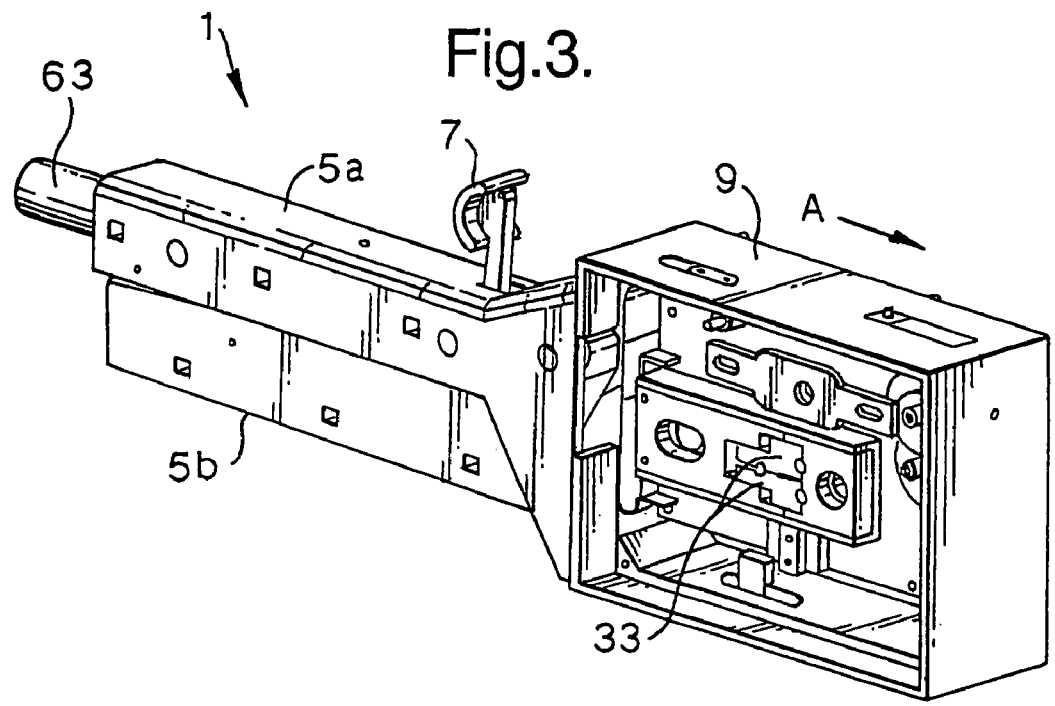
FIG. 3 shows part of the interior of the device of FIGS. 1 and 2; illustrating the crimping mechanism.
Figure 4:
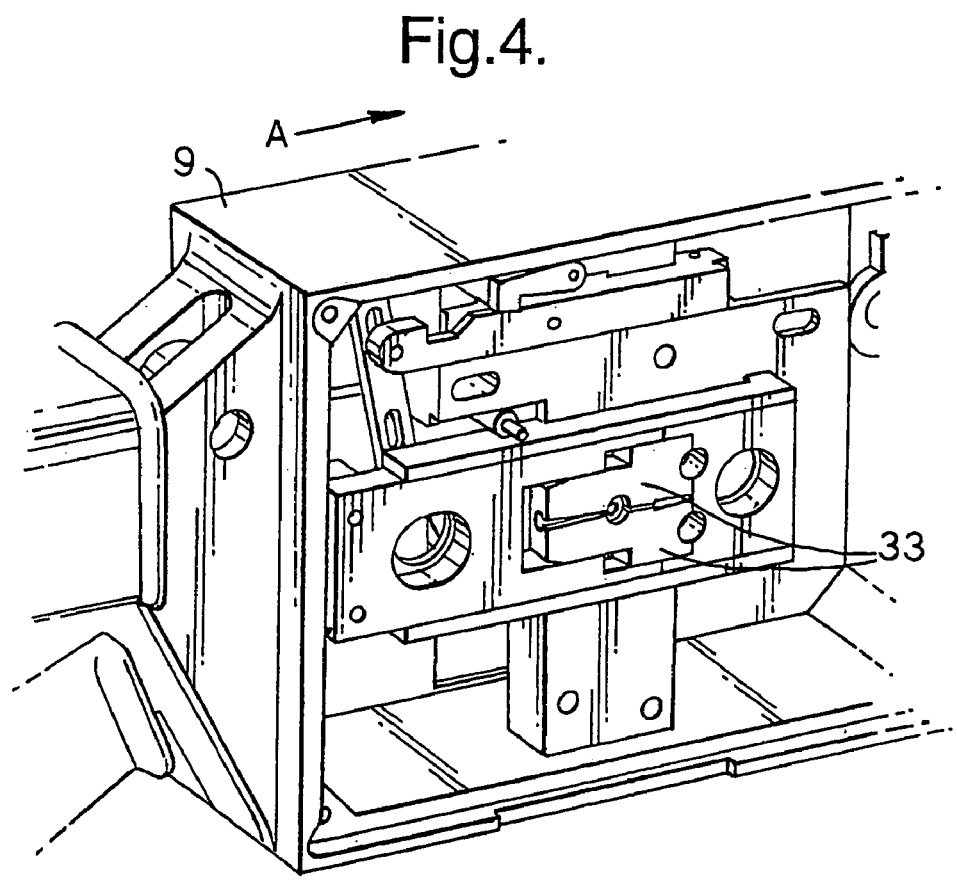
FIG. 4 shows a detail of another view of the interior of the device; illustrating the crimping mechanism.

Referring now to FIGS. 3 and 4, with the ferrule 15 and the optical fibre 19 so inserted into the device 1, the handles 5a and 5b are squeezed together until they lock in place. This action causes crimping blocks 33 to move relatively closer together by a predetermined distance, thereby crimping the ferrule around the fibre with a predetermined force, and thus fixing the ferrule to the fibre.

Subsequent to this crimping/fixing step, the slidable outer housing part 9 of the device is moved, by the user, away from the handles 5a and 5b, in the direction of arrow A in FIG. 1. This sliding movement causes various operations of the cleaving step to be performed by the device, by which the optical fibre is cleaved to produce a non-perpendicular end face of the fibre having a preset orientation and longitudinal position with respect to the ferrule.

The initial operation of the cleaving step comprises clamping of the optical fibre by means of a clamping mechanism comprising a pair of clamp blocks 35a and 35b, and a pair of spooled tapes 37a and 37b that extend over respective clamping surfaces of the clamp blocks. As may be understood from FIG. 7, movement of the slidable part 9 in the direction of arrow A causes the upper (as illustrated) clamp block 35a to move downwards (as indicated by arrow B) towards the lower clamp block 35b due to a contact between an upper surface of the upper clamp block with an inclined surface (i.e. inclined with respect to the direction of movement of the part 9) of a cooperating part 39 which moves with part 9. Since the tapes 37a and 37b extend over the respective clamping surfaces of clamp blocks 35a and 35b, the optical fibre is trapped between the tapes 37a and 37b (with the optical fibre and the tapes together trapped between the clamp blocks). The tapes 37a and 37b preferably are polymeric, for example polyvinyl chloride (PVC). The tapes preferably are compressible and preferably provide a high degree of grip by which they grip the optical fibre in their clamping position.

The use of such tapes has several benefits. Firstly, the high degree of grip on the optical fibre enables the fibre to be placed under tension for the cleaving operation (described below). Preferably, an axial pull resistance in the range 2.5 to 4.0 N is provided by the tapes. Secondly, the compressibility of the tapes generally prevents the optical fibre being damaged when clamped. Thirdly, the tapes 37a, 37b preferably are indexed such that they present a fresh surface between the clamp blocks, for clamping an optical fibre, each time the part 9 is moved to operate the cleaving mechanism. This indexing of the tapes is achieved by means of cog wheels 43a and 43b as shown in FIG. 8 (and part of wheel 43b is also visible in FIG. 7). The cog wheels 43a and 43b are connected to take-up reels 41a and 41b respectively, and are rotated through a preset partial revolution by means of the slidable housing part 9 being moved back towards the handles 5a, 5b (in the opposite direction to that of arrow A) after the cleaving operation has been completed. In this way, the tapes are wound-on by a preset amount (from their spools to their take-up reels) between each fibre cleaving operation. Consequently, any dust generated by fibre cleavages is carried away by the tapes between each cleaving operation, ensuring that every optical fibre cleaved by the device experiences substantially the same clamping conditions, thus ensuring consistency between optical fibres.

Figure 9:
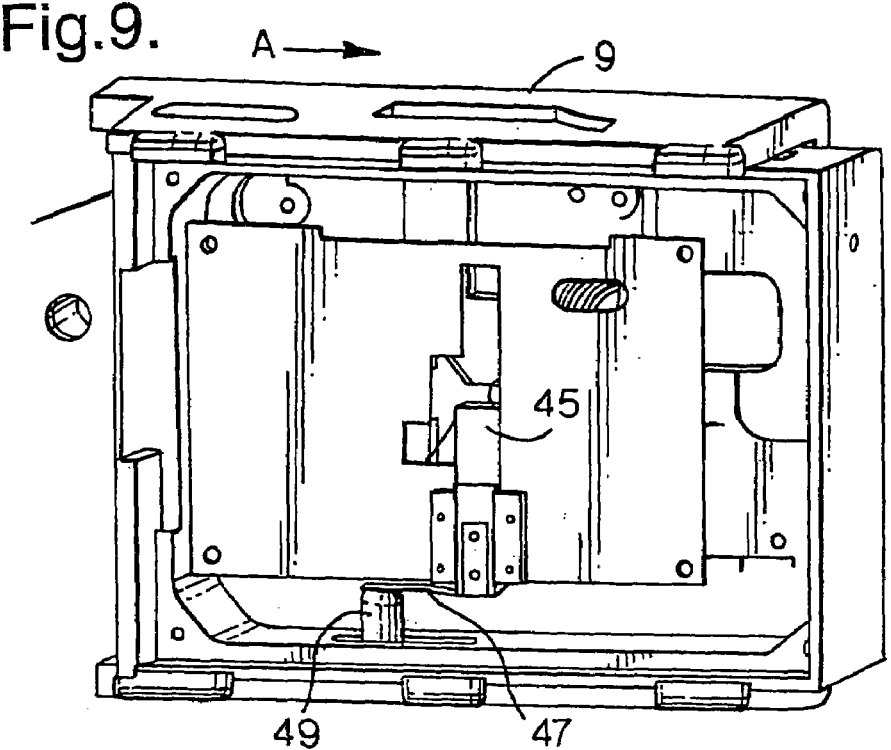
FIG. 9 shows part of both the exterior and the interior of the device, in particular the cleaving mechanism.

Once an optical fibre is clamped between the tapes 37a, 37b and the clamp blocks 35a, 35b, the continued movement of the slidable housing part 9 in the direction of arrow A causes an anvil 45 adjacent to the lower clamp block 35b to be raised in the direction opposite to that of arrow B (as illustrated in FIGS. 7 and 9). This movement of the anvil 45 is achieved by means of another cooperating part 47 having an inclined surface, which is lifted upwardly by means of a peg 49 that moves with part 9. Substantially simultaneously with this movement of the anvil 45, the clamp blocks 35a, 35b, which at this stage are clamping the inserted optical fibre, together move slightly away from the anvil in a direction along the axis of the fibre (i.e. backwards from the viewpoint of FIG. 7). This is achieved by means of a member 51 (as shown in FIG. 8) that slides together with part 9 and cooperates with a resilient member 53 to urge a plate 55 laterally with respect to the direction of arrow A (i.e. backwards from the viewpoint of FIG. 8). The clamp blocks 35a and 35b are moved away from the anvil by this movement of the plate 55, and this puts the section of the clamped optical fibre extending between the ferrule 15 and the clamp blocks 35a, 35b under tension. The fibre is also subjected to a localised shear force due to it being displaced by the upward movement of the anvil 45.

Figure 10:
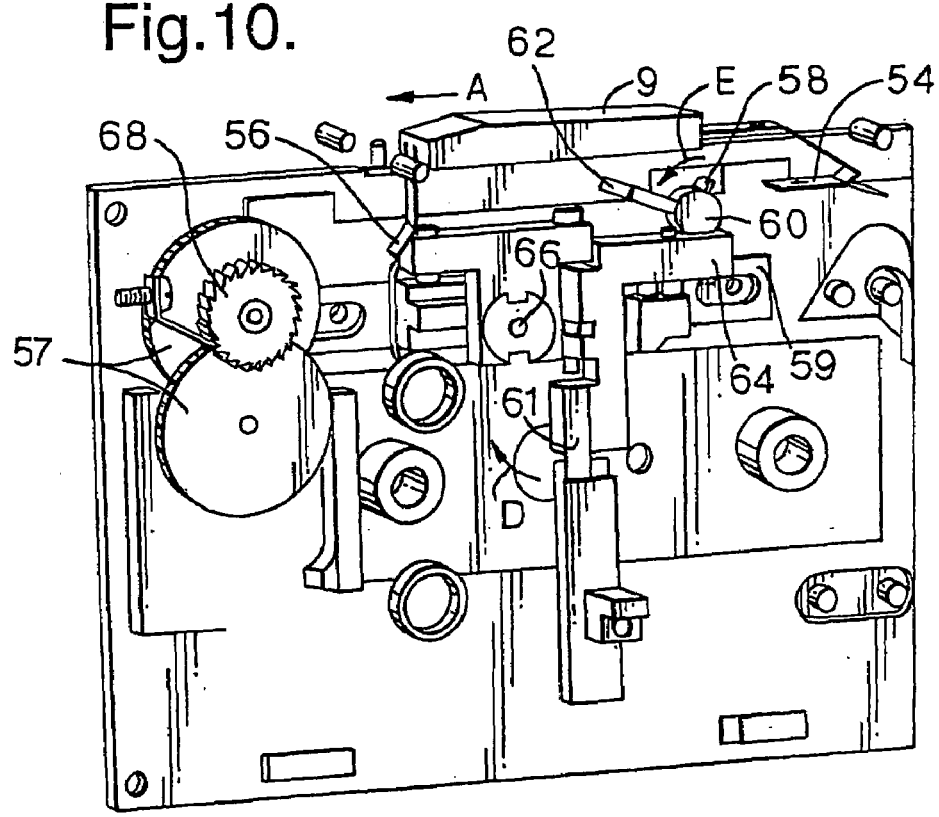
FIG. 10 shows a detail of another part of the cleaving mechanism of the device, in particular relating to the scoring blade.

Once the clamped optical fibre has been placed under tension and shear, further movement of the slidable part 9 in the direction of arrow A causes a first trigger element 54 (as shown in FIG. 10) attached to the part 9 (only a portion of which is shown in FIG. 10) to knock a tooth 58 of a rotatable member 60. This causes the rotatable member 60 to rotate in the direction of arrow E, causing another tooth 62 of the rotatable member 60 to impinge on a pivoted member 64 which is arranged to pivot about pivot point 66; consequently, member 64 pivots about point 66 in the direction of arrow D. A pivoted scoring blade 61 is attached to the pivoted member 64, and therefore the pivoting of this member also causes the scoring blade to rotate as indicated by arrow D, thereby scoring the optical fibre at a predetermined position along the fibre where the fibre is under both tension and shear. The resultant of the tension and shear forces applied to the fibre, together with the scored line of weakness caused by the scoring blade 61, cause the fibre to cleave substantially along a plane that is non-perpendicular to the axis of the fibre.

Figure 11:
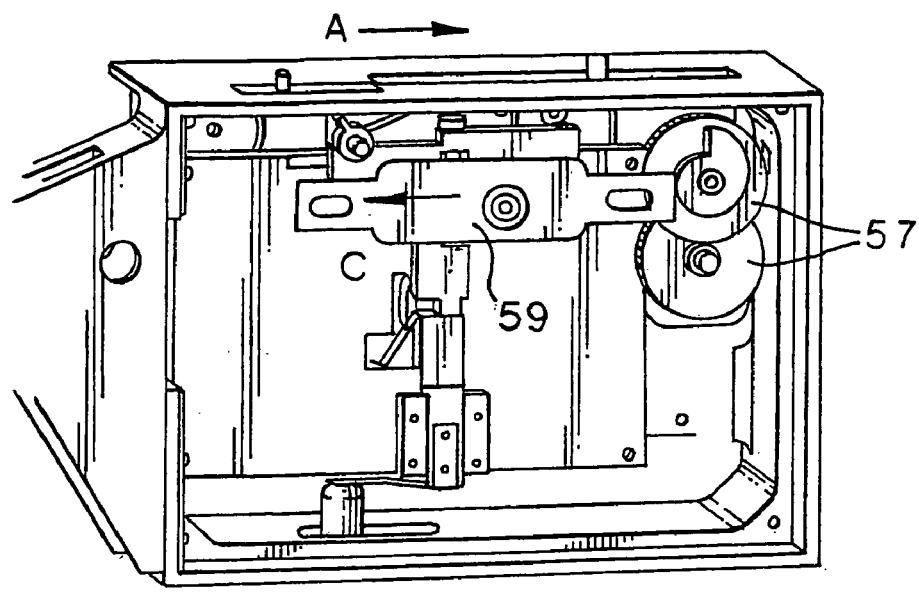
FIG. 11 shows a reverse view of the device, showing part of the scoring blade mechanism.

The movement of the part 9 in the direction of arrow A also causes a second trigger element 56, also attached to part 9 (see FIG. 10), to rotate a ratchet wheel 68 by a partial revolution (preferably one tooth of its toothed periphery). The ratchet wheel 68 is connected by a series of cogs to indexing wheels 57, shown in both FIG. 10 and FIG. 11. As shown in FIG. 11, a spiral wheel of the indexing wheels 57 causes a slidable bar 59 to move linearly in the direction of arrow C. Each movement of the bar 59 is by only a tiny amount for each actuating movement of the part 9. This movement of the slidable bar 59 causes the scoring blade 61 to move by a tiny amount, such that the starting point of the rotation of the scoring blade is very slightly different each time the device is used to cleave an optical fibre. In this way, the part of the scoring blade which scores an optical fibre is "indexed", i.e. a different part of the blade is used each time an optical fibre is cleaved. Consequently, each optical fibre experiences an unused part of the scoring blade, and consequently blunting of the blade over time does not cause a variation in the cleavage of optical fibres by the device over time. Preferably the distance by which the blade moves (to present a new starting position) each time the device is used, is so tiny, that hundreds or thousands (e.g. 5,000) cleavage operations can be performed by a single blade. The blade preferably comprises a diamond cutting edge.

Subsequent movement of the slidable housing part 9 back towards the handles 5a, 5b, causes the various components of the cleaving mechanism of the device to return to their starting positions, and causes the tapes 37a and 37b to be wound-on a specified length such that they present a fresh surface for the subsequent clamping operation. Pushing the release lever 7 in the direction of arrow A then releases the handles 5a and 5b which preferably open under the action of a resilient member (e.g. a spring—not shown) thereby opening the crimp blocks 33 and allowing the ferrule 15, and the cleaved optical fibre 19 to which it is fixed by crimping, to be removed from the device.

An additional preferred feature of the device 1 to be noted is the flexible arm 63 shown in FIG. 3. The flexible arm 63 enables the device to be attached to another piece of equipment, for example an optical fibre splice closure. The arm 63 may, for example, be a flexible attachment arm of the type used in some microphone stands (etc) and sometimes referred to as a "gooseneck".

It will therefore be appreciated that the device according to the invention may be in the form of tool (for example as illustrated herein, and described above) that may be handheld and hand-operated. The tool may conveniently be used by an optical fibre installation/repair technician in the field, as well as in the factory.

Additional aspects of the present invention relate to improvements by way of advantageous attachments and methods to be used with the Integrated Crimp & Cleave Tool (ICCT) hereinbefore described.

One improvement is achieved by attachment to the ICCT of a flexibly-positionable neck and clamp (similar to a "goose-neck" lamp, for example) for the purpose of temporarily attaching the ICCT in a convenient working position on a telecoms distribution frame or other apparatus where optical fibres are to be connected. The specific construction of the neck and clamp, and the specific means of their attachment to the ICCT are not critical and require no further description. One possible arrangement is illustrated in the aforementioned FIG. 3, and another is indicated hereinafter.

Another improvement is an ICCT device wherein a holder is attached to the ICCT for holding a connector, into which connector, when present in use, will be inserted a crimped ferrule and cleaved optical fibre prepared by use of the ICCT. The connector, hereinafter referred to as an "Alignment Sleeve Assembly" (ASA), can thus be conveniently held on the ICCT by the attached ASA Holder (ASAH) for insertion of the ferrule and fibre immediately after crimping and cleaving thereof by the ICCT. Preferably, the ASAH will be rotatably attached to the ICCT for insertion of a first ferrule and fibre into one end of the ASA, then a second ferrule and fibre into the other end of the ASA, after rotation of the ASAH to present the said other end for convenient insertion from substantially the same direction as the first.

The crimped ferrule and cleaved fibre are optionally secured in the ASA by means of a ferrule holder, for example as described in our co-pending British patent applications No. 0216435.8 (B429) and No. 0216434.1 (B427), both entire disclosures of which are incorporated herein by reference. This self-aligning combination of the ferrule holder, ferrule, and fibre, hereinafter referred to as a "Crimp & Key Assembly" (CKA), may be moved from the crimping-and-cleaving part of the ICCT to a position for insertion into the ASA by any convenient means, for example by the hand-held assembly tool described and claimed in our co-pending British patent application No. 0216436.6 (B428), the entire disclosure of which is incorporated herein by reference. However, in preferred versions of the present improvement, the CKA is held in a CKA Holder (CKAH) moveably attached to the ICCT. This CKAH holds the CKA during the crimp-and-cleave operation, and is preferably then moveable on a controlled path, for example by means of rails or other guides, from the crimp-and-cleave position to bring the CKA into alignment with the ASA when held in the ASAH. Thereafter, the CKAH is releaseable to allow insertion and locking of the CKA into the ASA.

Alternatively, the device according to this invention may have attached thereto securing means for directly securing the ferrule and the fibre during and after the crimp and cleave operation in the absence of any separate ferrule holder. In this case, the device preferably has transfer means attached thereto whereby the securing means and the secured crimped ferrule and cleaved fibre can be moved, preferably guided by guide means attached to the device, (i) to bring the ferrule and fibre from the crimp-and-cleave position into alignment with an ASA when held in the ASAH in use and (ii) to insert the ferrule and fibre into the ASA in the required orientation with or without a keying formation on the ferrule, the securing means being releasable after the ferrule has been fixed in the ASA in the required orientation.

The invention accordingly also provides a method of coupling optical fibres using such an alternative form of the device, including the steps of (a) directly securing a ferrule and a fibre in the said securing means during and after the crimp and cleave operation in the absence of any separate ferrule holder, (b) moving the secured crimped ferrule and cleaved fibre (i) to bring the ferrule and fibre from the crimp-and-cleave position into alignment with an ASA when held in the ASAH in use and (ii) to insert the ferrule and fibre into the ASA in the required orientation with or without a keying formation on the ferrule, (c) fixing the ferrule and fibre in the ASA in the required orientation, and (d) releasing the securing means.

Our aforementioned co-pending British patent application No. 0216434.1 (B427) describes the provision of a resilient member (spring) inside the CKA, between the end of the crimped ferrule and an inner end of the ferrule holder, for the purpose of compensating variable length tolerances in the two cleaved fibres whose ends are aligned when inserted into the ASA. Mass production of such CKAs with the internal spring can be undesirably difficult and expensive. It is therefore preferred to use a CKA wherein the ferrule holder and the resiliently compressible member are shaped and arranged so that the resiliently compressible member is removable from the holder after the holder has been attached to the connector body to retain the ferrule in place. Preferably, the ferrule holder and compressible member are shaped and arranged to permit re-use of the compressible member by insertion and removal thereof in and from a succession of similar CKAs for insertion and attachment to ASA connector bodies. Insertion and removal of the compressible member via lateral apertures in the ferrule holder body of the CKA may be convenient in practice.

A further improvement in the ICCT according to the present invention involves provision of a re-useable resiliently-compressible fibre-length-tolerance-compensating member, preferably carried by the CKA Holder (CKAH) as hereinafter described, for insertion in and subsequent removal from a succession of suitably shaped and arranged CKAs to be inserted into ASAs held in the ASAH attached to the ICCT.

In the alternative form of the invention wherein the ferrule is secured directly by the aforementioned securing means, the resilient compensation for variances in the crimp and cleave tolerances may be provided, for example incorporated in the securing means, in ways which will be apparent to suitably skilled engineers.

Embodiments of the aforementioned improvements will now be described by way of example with reference to FIG. 13–23.

Figure 13:
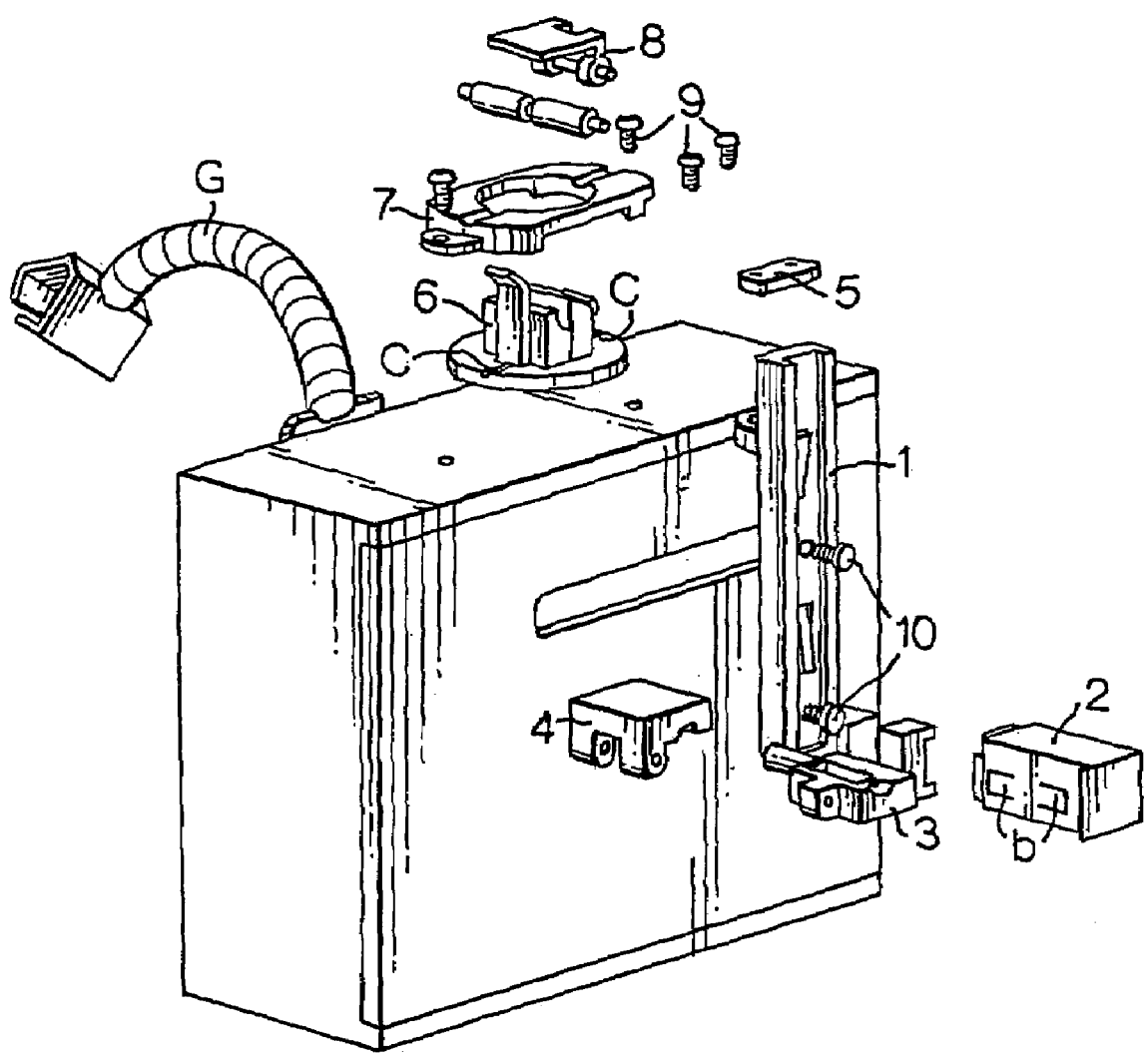
FIG. 13 is a three-dimensional view of an integrated crimp & cleave tool (ICCT) (schematically indicated with an attached "goose-neck" positioning clamp and attached CKAH, ASAH, and guide rails).

With reference to the drawings, FIG. 13 shows schematically a goose-neck positioning clamp G attached to the ICCT in a different position from that described in the aforementioned FIG. 3.

FIG. 13 also shows guide rail (1), which is fixed with two chamfered screws 10 and has two locks (a) to hold the CKAH retainer aligned firstly with the CKA entrance (not visible in this view) to the crimp-and-cleave part of the ICCT and subsequently with the ASAH (6) at the top (as shown in this example) of the ICCT;

CKAH retainer (2), which slides vertically up and down on rail (1) and has two locks (b) to lock the CKAH retainer in two different positions placing the CKA (when present in use) in and out of the crimping entrance of the ICCT and in and out of the ASA (when present in use);

CKAH (3), which slides horizontally to bring the CKA in/out of the said entrance of the ICCT and the said ASA;

CKAH cover (4), which closes over the CKA (when present) by hinging to hold the metal ferrule horizontally (see FIG. 17);

CKAH retainer stop module (5), which prevents CKAH retainer (2) from sliding out of guide rail (1);

ASAH (6), which can be rotated 180° after installation of the first CKA in the ASA and can be held in place by two features (c);

ASAH retainer (7), which is fixed by two screws on top of the ICCT;

ASAH cover (8), which holds the ASA (when present) by hinging; and

ASAH fixation screws (9).

The operating steps are illustrated in FIGS. 14 to 19 as follows:

Step 1: Place the ASA in the ASAH and close the cover, the arrangement being such that the ASA can be placed in only one orientation and cannot rotate or slide longitudinally in the ASAH;

Step 2: Slide the CKAH backwards, open the cover and place the CKA in the CKAH;

Step 3: Close the CKA cover to hold the CKA in place;

Step 4: Slide the CKAH towards the ICCT so that the metal ferrule enters the ICCT, then insert the optical fibre, crimp the ferrule, and cleave the fibre;

Step 5: Slide the CKAH backwards to remove the crimped ferrule and cleaved fibre from the ICCT, then lock the CKAH to prevent horizontal movement which might damage the filre during the next step;

Step 6: Slide the CKAH upwards to the ASAH and lock the CKAH in that position;

Step 7: Slide the CKAH forward to insert the CKA into the ASA as far as possible and lock in that position;

Step 8: Open the cover of the CKAH and release the CKA by moving the CKAH downwards;

Step 9: Slide the CKAH backwards as indicated by arrow;

Step 10: Slide the CKA fully into the ASA and lock it by rotating the CKA until it reaches the two diagonal opposed cylindrical "bayonet-fixing" protrusions, afterwards slide the CKAH downwards to the original starting position;

Step 11: Rotate the ASAH, place a new CKA in the CKAH and repeat all steps again to produce a completed connection of two cleaved fibres in the ASA, with the D-shape (arrowed) of the CKA ferrules ensuring correct alignment of the cleaved ends. Repeat the whole fibre-connecting operation as many times as required for the number of ASAs in which fibres are to be connected.

One possible arrangement according to the aforementioned re-useable spring aspect of the invention will now be described by way of example with reference to FIGS. 20 to 23. In this example, the compressible member 41 is a bifurcated leaf spring inserted as indicated by arrow A in FIG. 20 via a suitably-shaped lateral aperture 46 extending to opposite sides of the ferrule holder 39. The spring 41 thus permits the desired resilient movement of the ferrule 1 in the holder 39 during insertion into the ASA connector body (not shown) in the direction of arrow B. After the ferrule holder 39 is twisted (arrow C) into locking engagement with the connector, thus bringing the ferrule into fixed engagement with the ferrule holder as described in our aforementioned co-pending Application 0216434.1, the spring 41 is no longer required and may be removed, for example by means of an attached flexible member F schematically indicated.

Figure 23:
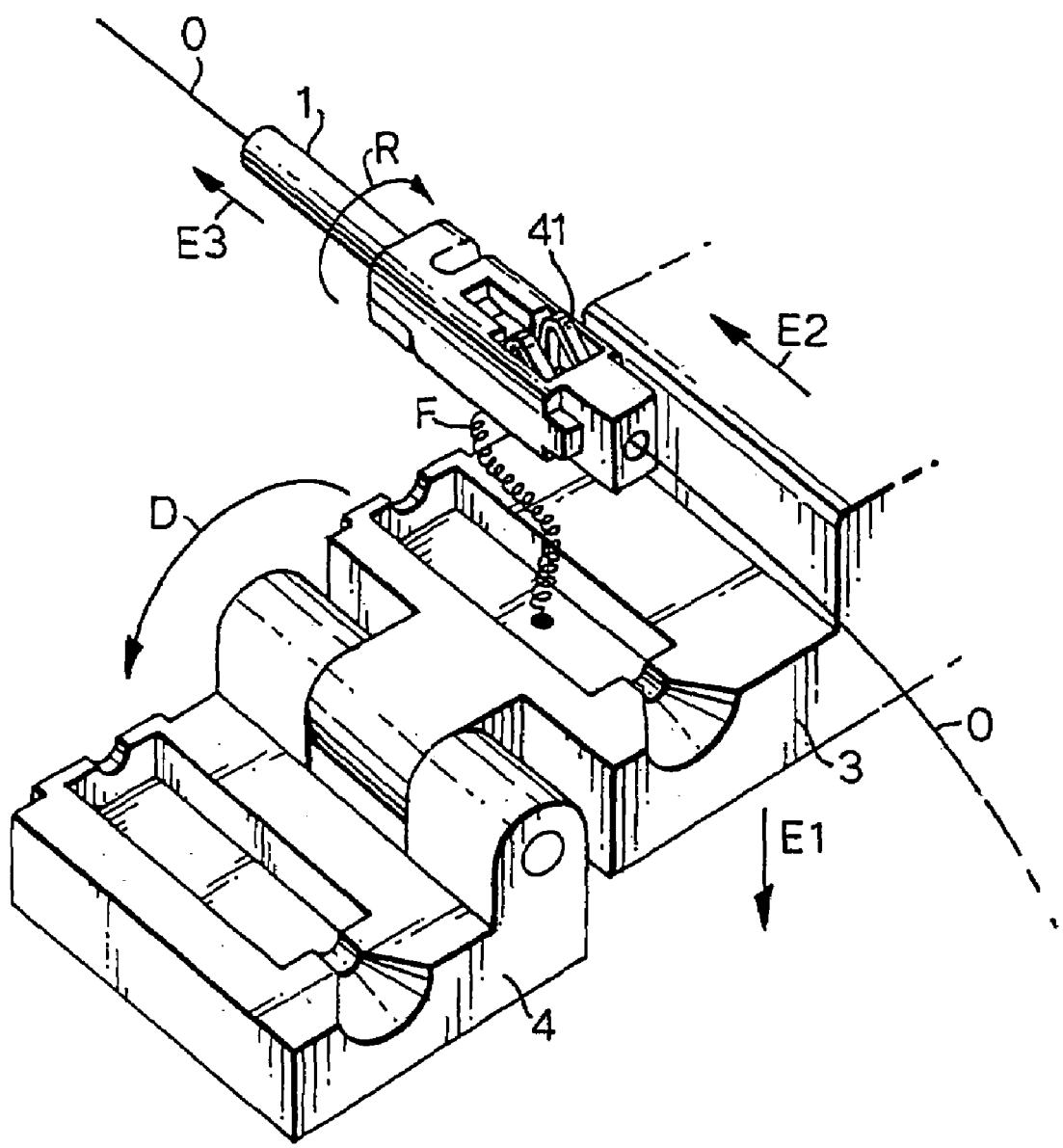

FIG. 21 illustrates the re-useable spring 41 positioned in the CKAH 3 prior to positioning of the CKA (ferrule 1, holder 39, and optical fibre O) therein and closure of the CKAH cover 4. In FIG. 22, the CKA is in position in the CKAH 3 with the spring 41 inserted into the aperture 46 in the holder 39 of the CKA, awaiting closure of the cover 4 to secure the CKA in the CKAH, to be followed by crimping of the ferrule and cleaving of the optical fibre O in the ICCT (not shown). FIG. 23 illustrates the opening (arrow D) of the CKAH cover 4 and lowering (arrow E1) of the CKAH 3 to release the CKA after the crimped ferrule 1 and the cleaved optical fibre (O) have been inserted, as far as the CKAH movement (arrow E2) will allow, into the ASA held in the ASAH (see FIG. 14). The flexible member F may be attached as schematically indicated to retain the re-useable spring 41 on the CKAH 3, optionally with some arrangement (not shown) for extending and retracting the flexible member F out of and into the CKAH structure. The flexibility of the extended member F allows the CKA, with the spring 41 in place to compensate fibre length tolerances as aforementioned, to be fully inserted (arrow E3) into the ASA and rotated (arrow R) to lock it in position, followed by removal of the spring 41 and retraction of the flexible member to reposition the spring in the CKAH ready for re-use in the next CKA to be fitted.

The invention claimed is:

1. A device for cleaving an optical fibre, comprising a fixing mechanism configured to fix a fixing element to the optical fibre, and a cleaving mechanism configured to cleave the optical fibre, the device comprising a flexibly-positionable neck and clamp configured to temporarily attach the device in a working position on a telecoms distribution frame or other apparatus where optical fibres are to be connected, and wherein the fixing mechanism and cleaving mechanism are arranged such that the fibre is cleaved, and consequently an end face of the fibre is produced, at a preset position along the fibre with respect to the fixing element and wherein the cleaving mechanism cleaves the fibre such that the fibre end face produced is oriented at a non-perpendicular angle with respect to a longitudinal axis of the fibre.

2. A device according to claim 1, further comprising a hand-held tool.

3. A device according to claim 1, wherein the fixing mechanism and the cleaving mechanism are mutually arranged such that the fibre end face produced by the cleaving mechanism is at a preset orientation with respect to the fixing element.

4. A device according to claim 3, wherein the fixing mechanism includes an orientation determining means arranged to orient the fixing element at a predetermined orientation about the longitudinal axis of the fibre, with respect to the cleaving mechanism.

5. A device according to claim 4, wherein the orientation determining means comprises a non-circular orifice arranged to receive the fixing element therein, the fixing element having a corresponding non-circular cross-section.

6. A device according to claim 1, wherein the cleaving mechanism includes a scoring blade configured to score the fibre and cause a crack to propagate through the fibre to cleave the fibre, wherein the scoring blade includes a plurality of positions such that for each fibre, or set of fibres that is cleaved by the device, a different one of the plurality of positions on the blade is used to score the fibre.

7. A device for cleaving an optical fibre, comprising a fixing mechanism configured to fix a fixing element to the optical fibre, and a cleaving mechanism configured to cleave the optical fibre, wherein a connector body holder is attached to the device to hold a connector body into which will be inserted a crimped ferrule and cleaved optical fibre prepared by use of the device and the connector body holder is rotatably attached to the device to enable insertion of a ferrule and fibre into each end of the connector body from directions of insertion less than 180 degrees apart.

8. A device according to claim 7, further comprising a hand-held tool.

9. A device according to claim 7, wherein the fixing mechanism and the cleaving mechanism are arranged such that the fibre is cleaved, and consequently an end face of the fibre is produced, at a preset position along the fibre with respect to the fixing element and wherein the cleaving mechanism cleaves the fibre such that the fibre end face produced is oriented at a non-perpendicular angle with respect to a longitudinal axis of the fibre.

10. A device according to claim 9, wherein the fixing mechanism and the cleaving mechanism are mutually arranged such that the fibre end face produced by the cleaving mechanism is at a preset orientation with respect to the fixing element.

11. A device according to claim 10, wherein the fixing mechanism includes an orientation determining means arranged to orient the fixing element at a predetermined orientation about the longitudinal axis of the fibre, with respect to the cleaving mechanism.

12. A device according to claim 11, wherein the orientation determining means comprises a non-circular orifice arranged to receive the fixing element therein, the fixing element having a corresponding non-circular cross-section.

13. A device according to claim 7, wherein the cleaving mechanism includes a scoring blade configured to score the fibre and cause a crack to propagate through the fibre to cleave the fibre, wherein the scoring blade includes a plurality of positions such that for each fibre, or set of fibres that is cleaved by the device, a different one of the plurality of positions on the blade is used to score the fibre.

14. A device for cleaving an optical fibre, comprising a fixing mechanism configured to fix a fixing element to the optical fibre, and a cleaving mechanism configured to cleave the optical fibre, wherein a connector body holder is attached to the device to hold a connector body into which will be inserted a crimped ferrule and cleaved optical fibre prepared by use of the device, wherein the device comprises a ferrule assembly holder configured to hold a ferrule assembly of (i) the ferrule and (ii) the fibre to be cleaved and (iii) a ferrule holder, wherein the ferrule assembly holder is adapted to hold the ferrule assembly during a crimp and cleave operation and the device comprises a guide means attached thereto, wherein the ferrule assembly holder is moveable on a controlled path from a crimp-and-cleave position to bring the ferrule assembly into alignment with a connector body when held in the connector body holder in use, and the ferrule assembly holder is then releaseable to enable insertion and locking of the ferrule assembly into the connector body.

15. A device according to claim 14, further comprising a hand-held tool.

16. A device according to claim 14, wherein the fixing mechanism and the cleaving mechanism are arranged such that the fibre is cleaved, and consequently an end face of the fibre is produced, at a preset position along the fibre with respect to the fixing element and wherein the cleaving mechanism cleaves the fibre such that the fibre end face produced is oriented at a non-perpendicular angle with respect to a longitudinal axis of the fibre.

17. A device according to claim 16, wherein the fixing mechanism and the cleaving mechanism are mutually arranged such that the fibre end face produced by the cleaving mechanism is at a preset orientation with respect to the fixing element.

18. A device according to claim 17, wherein the fixing mechanism includes an orientation determining means arranged to orient the fixing element at a predetermined orientation about the longitudinal axis of the fibre, with respect to the cleaving mechanism.

19. A device according to claim 18, wherein the orientation determining means comprises a non-circular orifice arranged to receive the fixing element therein, the fixing element having a corresponding non-circular cross-section.

20. A device according to claim 14, wherein the cleaving mechanism includes a scoring blade configured to score the fibre and cause a crack to propagate through the fibre to cleave the fibre, wherein the scoring blade includes a plurality of positions such that for each fibre, or set of fibres that is cleaved by the device, a different one of the plurality of positions on the blade is used to score the fibre.

21. A device for cleaving an optical fibre, comprising a fixing mechanism configured to fix a fixing element to the optical fibre, and a cleaving mechanism configured to cleave the optical fibre, wherein a connector body holder is attached to the device to hold a connector body into which will be inserted a crimped ferrule and cleaved optical fibre prepared by use of the device, wherein the device comprises a ferrule assembly holder configured to hold a ferrule assembly of (i) the ferrule and (ii) the fibre to be cleaved and (iii) a ferrule holder, wherein the ferrule assembly holder is adapted to hold the ferrule assembly during a crimp and cleave operation, wherein the ferrule assembly holder is configured to receive a succession of suitably shaped and arranged ferrule assemblies, and wherein the ferrule assembly holder carries a re-useable resiliently-compressible member configured to be inserted into successive ferrule assemblies, between the end of the ferrule and a facing internal end of the ferrule holder, to compensate resiliently for cleaved fibre length tolerance variations during insertion of the ferrule assemblies into connector bodies held in the connector body holder, and the compressible member is removable from the ferrule assemblies after insertion and locking of the ferrule assemblies into the connector bodies.

22. A device according to claim 21, wherein the compressible member is attached to the ferrule assembly holder by a flexible member of sufficient length and flexibility to permit release of the ferrule assembly from the ferrule assembly holder and insertion and locking of the ferrule assembly into the connector body held in the connector body holder in use while the compressible member is in place in the ferrule assembly.

23. A device according to claim 22, further comprising retraction means for retracting the flexible member after removal of the compressible member from the ferrule assembly-to re-position the compressible member on the ferrule assembly holder for insertion into the next ferrule assembly.

24. A device according to claim 21, further comprising a hand-held tool.

25. A device according to claim 21, wherein the fixing mechanism and the cleaving mechanism are arranged such that the fibre is cleaved, and consequently an end face of the fibre is produced, at a preset position along the fibre with respect to the fixing element and wherein the cleaving mechanism cleaves the fibre such that the fibre end face produced is oriented at a non-perpendicular angle with respect to a longitudinal axis of the fibre.

26. A device according to claim 25, wherein the fixing mechanism and the cleaving mechanism are mutually arranged such that the fibre end face produced by the cleaving mechanism is at a preset orientation with respect to the fixing element.

27. A device according to claim 26, wherein the fixing mechanism includes an orientation determining means arranged to orient the fixing element at a predetermined orientation about the longitudinal axis of the fibre, with respect to the cleaving mechanism.

28. A device according to claim 27, wherein the orientation determining means comprises a non-circular orifice arranged to receive the fixing element therein, the fixing element having a corresponding non-circular cross-section.

29. A device according to claim 21, wherein the cleaving mechanism includes a scoring blade configured to score the fibre and cause a crack to propagate through the fibre to cleave the fibre, wherein the scoring blade includes a plurality of positions such that for each fibre, or set of fibres that is cleaved by the device, a different one of the plurality of positions on the blade is used to score the fibre.

30. A device for cleaving an optical fibre, comprising a fixing mechanism configured to fix a fixing element to the optical fibre, and a cleaving mechanism configured to cleave the optical fibre, wherein a connector body holder is attached to the device to hold a connector body into which will be inserted a crimped ferrule and cleaved optical fibre prepared by use of the device, the device further comprising a securing means attached thereto for directly securing the ferrule and the fibre during and after a crimp and cleave operation in the absence of any separate ferrule holder.

31. A device according to claim 30 further comprising a transfer means configured such that the securing means and the secured crimped ferrule and cleaved fibre can be moved and guided by a guide means attached to the device, (i) to bring the ferrule and fibre from a crimp-and-cleave position into alignment with an connector body when held in the connector body holder in use and (ii) to insert the ferrule and fibre into the connector body in a required orientation with or without a keying formation on the ferrule, the securing means being releasable after the ferrule has been fixed in the connector body in the required orientation.

32. A device according to claim 30, further comprising a hand-held tool.

33. A device according to claim 30, wherein the fixing mechanism and the cleaving mechanism are arranged such that the fibre is cleaved, and consequently an end face of the fibre is produced, at a preset position along the fibre with respect to the fixing element and wherein the cleaving mechanism cleaves the fibre such that the fibre end face produced is oriented at a non-perpendicular angle with respect to a longitudinal axis of the fibre.

34. A device according to claim 33, wherein the fixing mechanism and the cleaving mechanism are mutually arranged such that the fibre end face produced by the cleaving mechanism is at a preset orientation with respect to the fixing element.

35. A device according to claim 34, wherein the fixing mechanism includes an orientation determining means arranged to orient the fixing element at a predetermined orientation about the longitudinal axis of the fibre, with respect to the cleaving mechanism.

36. A device according to claim 35, wherein the orientation determining means comprises a non-circular orifice arranged to receive the fixing element therein, the fixing element having a corresponding non-circular cross-section.

37. A device according to claim 30, wherein the cleaving mechanism includes a scoring blade configured to score the fibre and cause a crack to propagate through the fibre to cleave the fibre, wherein the scoring blade includes a plurality of positions such that for each fibre, or set of fibres that is cleaved by the device, a different one of the plurality of positions on the blade is used to score the fibre.

38. A method of coupling optical fibres using a device comprising a fixing mechanism configured to fix a fixing element to an optical fibre, and a cleaving mechanism configured to cleave the optical fibre, the method comprising:
 (a) directly securing a ferrule and a fibre in a securing means during and after a crimp and cleave operation in the absence of any separate ferrule holder,
 (b) moving the secured crimped ferrule and cleaved fibre
  (i) to bring the ferrule and fibre from the crimp-and-cleave position into alignment with a connector body when held in a connector body holder and (ii) to insert the ferrule and fibre into the connector body in a required orientation with or without a keying formation on the ferrule,
 (c) fixing the ferrule and fibre in the connector body in the required orientation, and then
 (d) releasing the securing means.

* * * * *